United States Patent
Turcanu

(10) Patent No.: US 7,965,662 B2
(45) Date of Patent: Jun. 21, 2011

(54) METHOD OF AND SYSTEM FOR TRANSMITTING MESSAGING SERVICE MESSAGES BETWEEN TWO TELECOMMUNICATIONS SYSTEM USING DIFFERENT MESSAGE STRUCTURES

(75) Inventor: Calin Turcanu, Helsinki (FI)

(73) Assignee: Nokia Siemens Networks Oy, Espoo (FI)

( * ) Notice: Subject to any disclaimer, the term of this patent is extended or adjusted under 35 U.S.C. 154(b) by 0 days.

(21) Appl. No.: 10/528,764

(22) PCT Filed: Sep. 25, 2003

(86) PCT No.: PCT/FI03/00699
§ 371 (c)(1),
(2), (4) Date: Mar. 22, 2005

(87) PCT Pub. No.: WO2004/030380
PCT Pub. Date: Apr. 8, 2004

(65) Prior Publication Data
US 2005/0255832 A1    Nov. 17, 2005

(30) Foreign Application Priority Data
Sep. 27, 2002   (FI) ...................................... 20021728

(51) Int. Cl.
*G06F 15/16*   (2006.01)
(52) U.S. Cl. ......... 370/310; 370/465; 709/218; 455/466
(58) Field of Classification Search ............... 455/414.1; 370/465, 469
See application file for complete search history.

(56) References Cited

U.S. PATENT DOCUMENTS

| | | | |
|---|---|---|---|
| 2003/0055912 A1* | 3/2003 | Martin et al. ................ | 709/218 |
| 2003/0214970 A1* | 11/2003 | Pimentel ...................... | 370/465 |
| 2004/0110493 A1* | 6/2004 | Alvarez et al. .............. | 455/414.1 |
| 2004/0131083 A1* | 7/2004 | Arques et al. ................ | 370/469 |
| 2005/0259604 A1* | 11/2005 | Salmi ............................ | 370/310 |

FOREIGN PATENT DOCUMENTS

| | | |
|---|---|---|
| EP | 0 854 655 A2 | 7/1998 |
| EP | 1 341 391 A1 | 9/2003 |
| WO | WO 97/20442 | 6/1997 |
| WO | WO 00/56091 | 9/2000 |
| WO | WO 02/15603 A2 | 2/2002 |
| WO | WO 02/060198 | 8/2002 |
| WO | WO 03/090486 | 10/2003 |

OTHER PUBLICATIONS

WAP WDP Version 05—Nov. 1999; "Wireless Application Protocol; Wireless Datagram Protocol Specification." Wireless Application Protocol Forum Ltd., pp. 1-78.

* cited by examiner

*Primary Examiner* — Phuoc Doan
(74) *Attorney, Agent, or Firm* — Squire, Sanders & Dempsey (US) LLP

(57) ABSTRACT

Different kinds of telecommunication systems exist, the systems supporting different kinds of messaging service message structures. In order to enable sending of a message from a sender (TS) in a first system (1) having a first structure for messages to a receiver (GS) of a second system (2) having a second structure for the messages, a bearer independent protocol is utilized (12) in the transmission of the message.

3 Claims, 5 Drawing Sheets

METHOD OF AND SYSTEM FOR TRANSMITTING MESSAGING SERVICE MESSAGES BETWEEN TWO TELECOMMUNICATIONS SYSTEM USING DIFFERENT MESSAGE STRUCTURES

FIELD OF THE INVENTION

The invention relates to transmitting messaging service messages between two telecommunications systems using different message structures, and particularly to transmitting messaging service messages between two different mobile systems. A mobile system generally refers to any telecommunications system enabling wireless communication while users are moving within the service area of the system.

BACKGROUND OF THE INVENTION

To meet the communication needs of mobile users, various public radio networks, such as a digital mobile communication system GSM (Global System for Mobile Communication), have been developed. Besides public networks with a wide coverage area, various wireless local area networks and private networks have also been developed, such as professional mobile radio or private mobile radio (PMR) systems. They are dedicated radio systems developed primarily for professional and governmental users, such as the police, military forces, oil plants, different types of company networks etc. One example of digital PMR systems is TETRA (Terrestrial Trunked Radio) which is defined by ETSI (European Telecommunications Standards Institute).

At the very beginning, GSM specifications defined a short message service which has become one of the most used supplementary services offered by the GSM. Now a wide variety of services, such as news, weather, jokes, etc. are accessible via short messages. In addition to text-only short messages, services comprising multimedia messages are also provided today. These various message services have in common that they are typically asynchronous transfer of data, transferred on system control channels between actual signalling. In other words, they use the same basic principles as the short message service of the GSM.

Since the short message service has been so popular in the GSM, corresponding messaging services are also included in other systems. For example, TETRA standards define an SDS (short data service) whose basic principles are similar to the messaging services based on the short message service of the GSM.

However, the definitions of different standards for the same type of messaging service differ from each other. Therefore, a subscriber of one system cannot send a messaging service message to a subscriber of another system. For example, TETRA subscribers cannot send text-only SDS messages to GSM subscribers, and GSM subscribers cannot send short messages to TETRA subscribers.

One solution to the above problem is to define an interface between the messaging services of these two different systems. However, since there are also other systems and systems are evolving rapidly, one interface definition is not enough, but several different interfaces have to be defined, which makes the systems more complicated and more difficult to maintain.

BRIEF DESCRIPTION OF THE INVENTION

An object of the present invention is to provide a method and an apparatus for implementing the method so as to solve the above problems. The objects of the invention are achieved by a method and an arrangement which are characterized by what is stated in the independent claims. The preferred embodiments of the invention are disclosed in the dependent claims.

The invention is based on realizing the problem and solving it by utilizing a bearer independent protocol defined for information transmission enabling easy, preferably fast delivery of relevant information and services to users. The bearer independent protocol is a mechanism providing access to bearers and it means a protocol which is designed to be as independent as possible from the underlying network technology. The bearer independent protocol typically stands on top of a bearer transport protocol. Examples of bearers are HTTP (hypertext transfer protocol), TCP (transmission control protocol), UDP (user datagram protocol) and other technologies using IP (Internet Protocol), TDMA (time division multiple access), CDMA (code division multiple access), ATM (asynchronous transfer mode), etc.

An advantage of the invention is that it enables messaging services between systems which support different kinds of messaging service message structures.

BRIEF DESCRIPTION OF THE DRAWINGS

In the following, the invention will be described in greater detail by means of preferred embodiments with reference to the attached drawings, in which.

DETAILED DESCRIPTION OF THE INVENTION

The present invention is applicable in any telecommunication system providing messaging services. Such systems include, besides the above mentioned GSM and TETRA, for instance what are called third generation mobile systems, such as the UMTS and IS-41, and mobile systems corresponding to the GSM system, such as GSM 1800 and PCS (Personal Communication System), and systems based on said systems, such as GSM 2+ systems and future mobile systems, such as fourth generation mobile systems. In the following, the invention is described using the GSM and TETRA systems and their text-only messaging services with the WAP (wireless application protocol) as an example of the bearer independent protocol, without restricting the invention thereto. The specifications of mobile systems and bearer independent protocols develop continuously. Such development may require extra changes in the invention. All words and expressions should therefore be interpreted broadly and they are intended to illustrate, not restrict, the invention.

Figure 1:
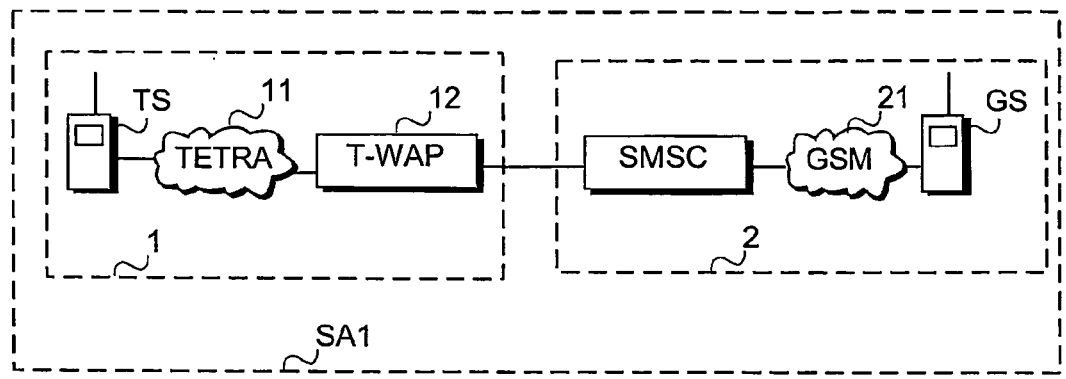
FIG. 1 illustrates first exemplary system architecture according to the invention.
Figure 6:
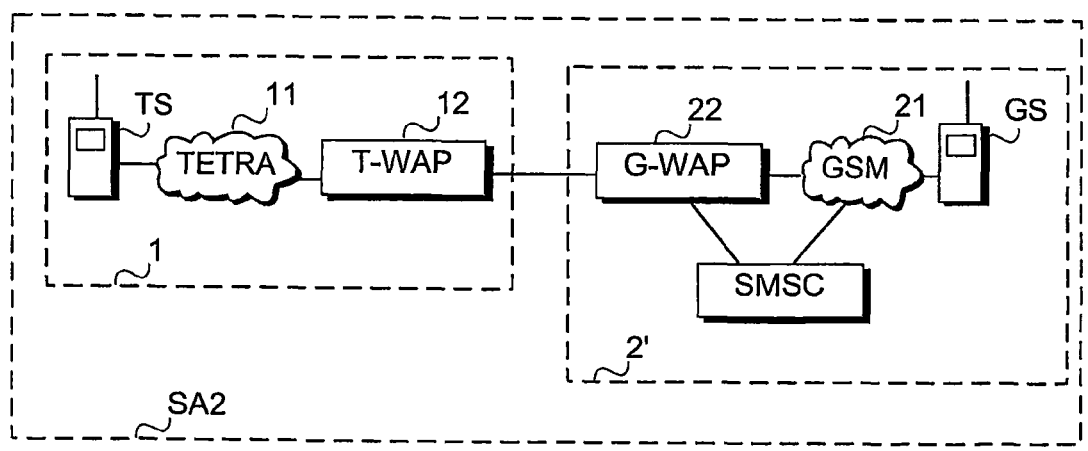
FIG. 6 illustrates second exemplary system architecture according to the invention.

FIGS. 1 and 6 show simplified system architectures illustrating only some networks and nodes of a given system architecture. The implementation of the network nodes shown in FIGS. 1 and 6 is only an example of implementing network nodes. It is apparent to a person skilled in the art that the systems may also comprise other networks, network nodes, functions and structures that need not be described in detail herein.

FIG. 1 shows an exemplary system architecture SA1. In the exemplary system architecture SA1, a first system 1 is a system according to the TETRA standards comprising TETRA user equipment TS and a TETRA network 11. The basic TETRA network 11 architecture is called a Switching and Management Infrastructure (SwMI). The SwMI includes all equipment and means which enable the users to communicate with each other via the SwMI. It should be noted that the exact structure and operation of the SwMI and the operation of the first system are not relevant to the invention. Generally, the SwMI may be any mobile network infrastructure which provides switching and mobility management functions. The TETRA network 11 architecture implemented by Nokia Corporation, Finland, comprises digital exchanges DXT, some of the DXTs providing a gateway to other telecommunications networks. For the SDS, each DXT is typically provided with a functionality which is related to messaging service messages and corresponds to a functionality provided by the short message service centre of the GSM system.

The first system comprises a server for the usage of the bearer independent protocol. In other words, the first system comprises a TETRA WAP server 12 employing the WAP, which is a protocol specification for a communications protocol and an application environment. In a mobile system services provided on the Internet, intranet or extranet can typically be used by means of the WAP subscriber terminals, i.e. user equipments. WAP services are typically used through a WAP gateway called a WAP server. If required, further information can be found on the home page of WAP Forum working on the WAP specification at http://www.wapforum.org. The TETRA WAP server 12 comprises a text application T-WAP for messaging services according to the invention. The functionality of the WAP-server, and more specifically, the functionality of the text application T-WAP according to different embodiments of the invention will be described below. The TETRA WAP server 12 comprises either a database or a connection to an external database (neither of them shown in FIG. 1) for the text application.

In the exemplary system architecture SA1, a second system 2 is a system according to the GSM comprising a GSM network 21 and GSM user equipment GS. Since the GSM is a very well known system among the ones skilled in the art, there is no need to discuss it in more detail here. Furthermore, it should be noted that the exact structure and operation of the GSM network 21 and the operation of the second system are not relevant to the invention.

For the short message service, the second system 2 comprises at least one short message service centre SMSC which forwards short messages, and stores and retransmits those not delivered. As one skilled in the art knows, all short messages are transmitted through a short message service centre.

When the TETRA WAP server 12 is connected to a short message service centre SMSC, the TETRA WAP server 12 will inform the SMSC how to forward messages targeted to a TETRA subscriber, i.e. TETRA user equipment TS. Since the TETRA system may have more than one TETRA WAP server, and more than one of them may be connected to one short message service centre, the SMSC may select the TETRA WAP-server on the basis of a priority list, or on the basis of the number spaces of TS numbers allocated for each TETRA WAP server, for example. Typically all TETRA WAP servers are linked together and thus it bears no significance for the TS via which TETRA WAP server it receives the message.

Figure 2:
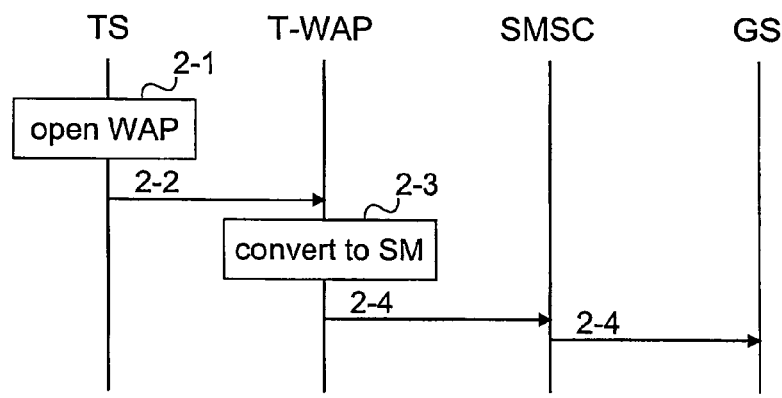
FIGS. 2, 3, 4 and 5 each illustrate exemplary signalling in embodiments employing the first exemplary system architecture.
Figure 3:
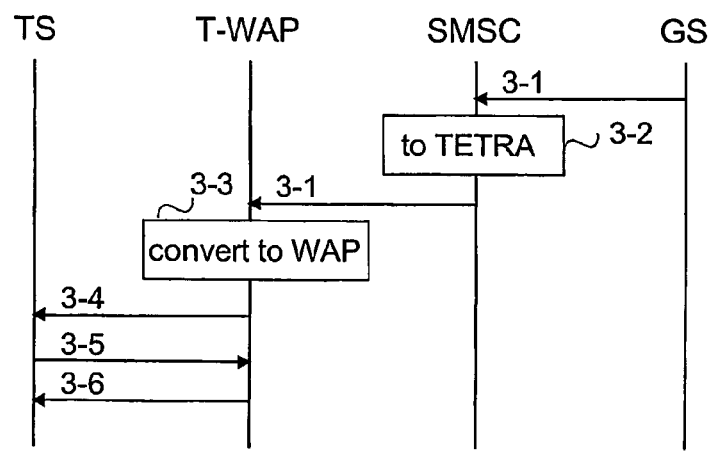

FIGS. 2 and 3 illustrate the signalling according to embodiment 1 of the present invention. Embodiment 1 employs the network architecture SA1 disclosed in FIG. 1. Furthermore, in embodiment 1 it is assumed that the user equipment in the first system, i.e. the TS in FIG. 1, has a WAP browser and a subscription allowing the usage of different WAP services, or at least the text application T-WAP in the TETRA WAP server.

WAP services can be used based on either the conventional request-response (pull) technology or push technology. In the request-response technology, a service request from a subscriber terminal is identified at a node of a network system and forwarded to a content server providing the requested service, after which response data generated in the content server on the basis of the service request is forwarded to the subscriber terminal. In the push technology, a server transmits data to a subscriber terminal on the basis of a request made once by the user without a transmission request related to an individual transmission. If required, further information can be found on the home page of WAP Forum working on the WAP specification at http://www.wapforum.org.

FIG. 2 depicts functionality according to embodiment 1 when the TS user wants to send a short message to a GS user. The functionality of sending from TETRA to an external system may be implemented directly in the equipment so that the equipment itself opens the WAP browser to the service application when the user selects from "write message" option "to another system" or "write message to an external system", for example. Another way to implement the functionality is that the user knows that he has to select a WAP service and select this service from his WAP bookmarks, i.e. the functionality is implemented as a prior art WAP service. However, it bears no significance for the invention how the WAP browser is selected.

In point 2-1 a WAP browser is opened and the WAP browser requests the content of the message, i.e. the text, and the GSM number of the GS, in a separate field. When the message is ready, the TS sends the message 2-2 to the TETRA WAP server having the text application T-WAP. Message 2-2 is preferably sent using WAP IP (Internet Protocol). When the text application T-WAP receives message 2-2, it separates the GSM-number of the receiver and the actual content from the message in point 2-3 and converts the message from the WAP message to a short message in point 2-3. After the conversion the message has the same structure as the short messages according to the GSM specifications. After conversion the TETRA WAP server sends the short message 2-4 to the receiver's short message service centre SMSC via which the short message 2-4 is transmitted according to prior art to the receiver's equipment GS.

FIG. 3 depicts functionality according to embodiment 1 when the GS user wants to send a short message to a TETRA subscriber, i.e. to the TS. The GS user forms the short message and sends the short message 3-1 to the GS user's short message service centre SMSC, all this according to prior art. In embodiment 1, the SMSC is configured to recognize SMs targeted to another system, such as the first system, and route those SMs to the corresponding WAP server. In point 3-2 the short message service centre recognises from the receiver's number that the short message is targeted to a TETRA subscriber and sends the short message 3-1 to the TETRA WAP server. The TETRA WAP server, and more specifically the text application T-WAP, separates the content and the receiver's address from the short message in point 3-3, stores the content in the database and sends the URL address of the content to the receiver's TS in a WAP Push message 3-4. The URL (uniform resource locator) address is an identifier individualising both a file or directory in an information network and the protocol needed to use it. When the TS user wants to read the message, he just proceeds according to prior art, i.e. selects the message in his equipment and the equipment sends the WAP Pull message 3-5, and the user sees the content of message 3-1 from message 3-6. In other words, the user will browse the message that was addressed to him by using WAP.

Figure 4:
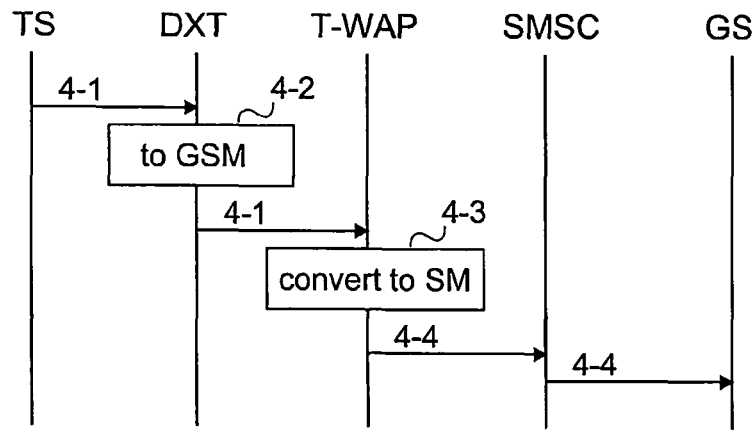
Figure 5:
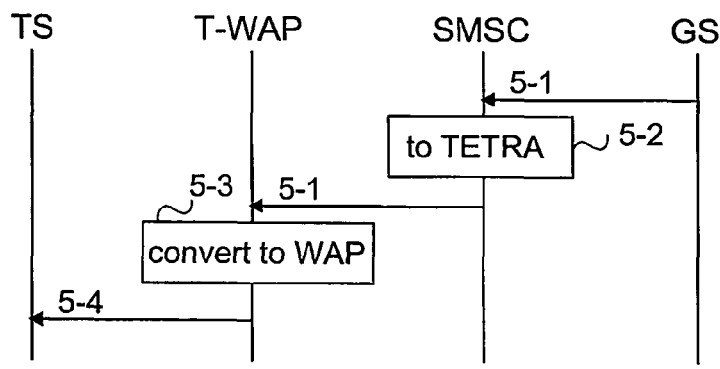

FIGS. 4 and 5 illustrate the signalling according to embodiment 2 of the present invention. Embodiment 2 employs the network architecture SA1 disclosed in FIG. 1. Furthermore, in the embodiment 2 it is assumed that neither the receiving user equipment nor the sending user equipment utilizes WAP.

FIG. 4 depicts functionality according to embodiment 2 when the TS user wants to send a short data message, i.e. an SD, to a GS user. The TS user forms the SD and sends the SD in message 4-1 to the DXT, all this according to prior art. In embodiment 2, DXTs are configured to recognize SDs targeted to another system, such as the second system, and route those SDs to the TETRA WAP server. Therefore in point 4-2, the DXT recognizes on the basis of the receiver's number that the SD is targeted to the GSM system and forwards the message 4-2 to the TETRA WAP server having the text application T-WAP. When the text application T-WAP receives message 4-2, it separates the GSM-number of the receiver and the actual content from the message in point 4-3 and converts the message from the short data message to a short message in point 4-3. The conversion is preferably made in two steps: in step 1 the short data message is converted to a message according to WAP and in step 2 the WAP message is converted to be a short message. With this 2-step conversion it is easy to add support for conversion to other message structures, step 1 remains as it is and only step 2 has to be modified. After the conversion the message has the same structure as the short messages according to the GSM specifications. After that the TETRA WAP server sends the short message 4-4 to the receiver's short message service centre SMSC via which the short message 4-4 is transmitted according to prior art to the receiver's equipment GS.

In another embodiment of the invention all SDs are routed to the TETRA WAP server, which comprises the functionality related to messaging services. In this embodiment, the TETRA WAP server recognises that message 4-1 is towards the GS and in response to the recognition converts the message. Messages targeted to other TETRA subscribers are not converted. In this embodiment the functionality related to messaging services is preferably not provided in DXTs.

FIG. 5 depicts functionality according to embodiment 2 when the GS user wants to send a short message to a TETRA subscriber, i.e. to the TS. The GS user forms the short message and sends the short message 5-1 to the GS user's short message service centre SMSC, all this according to prior art. In point 5-2 the short message service centre recognises from the receiver's number that the short message is targeted to a TETRA subscriber and sends the short message 5-1 to the TETRA WAP server. The TETRA WAP server, and more specifically the text application T-WAP, separates the content and the receiver's address from the short message in point 5-3 and converts the short message to an SD message in point 5-3. The conversion is preferably made in two steps, as described above, but now in the reverse order. After the conversion the message has the same structure as the SD messages according to TETRA specifications. After the conversion the TETRA WAP server sends the SD message 5-4 via the DXT to the receiver's TS.

FIG. 6 shows an exemplary system architecture SA2. In the exemplary system architecture SA2 the first system 1 is similar to the first system in FIG. 1, i.e. is a system according to the TETRA standards comprising TETRA user equipment TS, a TETRA network 11 and a TETRA WAP server with the text application T-WAP and a database or a connection to an external database, and there is no need to discuss it in more detail here.

In the exemplary system architecture SA2, a second system 2' is a system according to the GSM comprising a GSM network 21 and GSM user equipment GS and a short message service centre SMSC, just like the second system in FIG. 1. The foregoing network nodes have been described above in connection with FIG. 1. The second system 2' also comprises a server for the usage of the bearer independent protocol. In other words, the second system comprises a GSM WAP server 22 employing the WAP according to the principles disclosed above in FIG. 1 and comprising a text application G-WAP and a database or a connection to an external database. The text application G-WAP is similar to the text application T-WAP in the TETRA WAP server. The GSM WAP server differs from the TETRA WAP server only in that it is a WAP gateway used for the GSM network, whereas the TETRA WAP server is a WAP gateway used for the TETRA network. Therefore, there is no need to repeat the above description relating to WAP.

Figure 7:
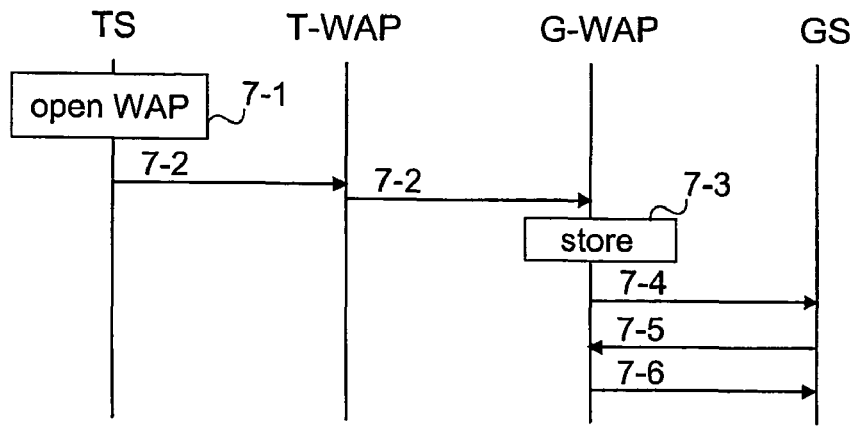
FIGS. 7 to 14 each illustrate exemplary signalling in embodiments employing the second exemplary system architecture.
Figure 8:
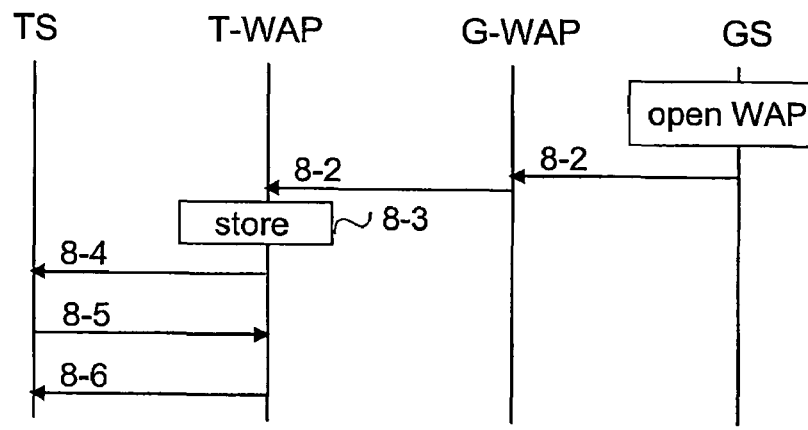

FIGS. 7 and 8 illustrate the signalling according to embodiment 3 of the present invention. Embodiment 3 employs the network architecture SA2 disclosed in FIG. 6. Furthermore, in the embodiment 3 it is assumed that the user equipment in the first and the second system, i.e. the TS and GS in FIG. 6, has a WAP browser and a subscription allowing the usage of different WAP services, or at least the text application T-WAP, G-WAP in the corresponding WAP server. The functionality of sending to an external system may be implemented directly in the equipment or according to prior art WAP-service, as described above. In this example the external system for TS is the GSM and for GS the TETRA.

FIG. 7 depicts functionality according to embodiment 3 when a TS user wants to send a short message to a GS user. In point 7-1 a WAP browser is opened and the WAP browser requests the content of the message, i.e. the text, and the GSM number of the GS, in a separate field. When the message is ready, the TS sends the message 7-2 to the TETRA WAP server having the text application T-WAP. Message 7-2 is preferably sent using the WAP IP. The TETRA WAP server forwards the message 7-2, i.e. the address and the content to the GSM WAP server having the text application G-WAP. When the text application G-WAP in the GSM WAP server receives message 7-2, it separates the content and the receiver's GSM address from the message in point 7-3, stores the content and sends the URL address of the content to the receiver's GS in a WAP Push message 7-4. When the GS user wants to read the message, he just proceeds according to prior art, i.e. selects the message in his equipment and the equipment sends the WAP Pull message 7-5, and the user sees the content of message 7-2 from message 7-6. In other words, the user will browse the text message that was addressed to him by using WAP.

FIG. 8 depicts functionality according to embodiment 3 when the GS user wants to send a short message to a TS user. In point 8-1 a WAP browser is opened, and the WAP browser requests the content of the message, i.e. the text, and the TETRA number of the TS, in a separate field. When the message is ready, the GS sends the message 8-2 to the GSM WAP server having the text application G-WAP. Message 8-2 is preferably sent using the WAP IP. The GSM WAP server forwards the message 8-2, i.e. the address and the content to the TETRA WAP server having the text application T-WAP. When the text application in TETRA WAP server receives message 8-2, it separates the content and the receiver's address from the message in point 8-3, stores the content and sends the URL address of the content to the receiver's TS in a WAP Push message 8-4. When the TS user wants to read the message, he just proceeds according to prior art, i.e. selects the message in his equipment and the equipment sends the WAP Pull message 8-5, and the user sees the content of message 8-2 from message 8-6. In other words, the user will browse the text message that was addressed to him by using WAP.

As can be seen, the SMSC is not needed in embodiment 3. Thus, the first system and/or the second system do not have to comprise functionality for messaging service centre in embodiment 3.

Figure 9:
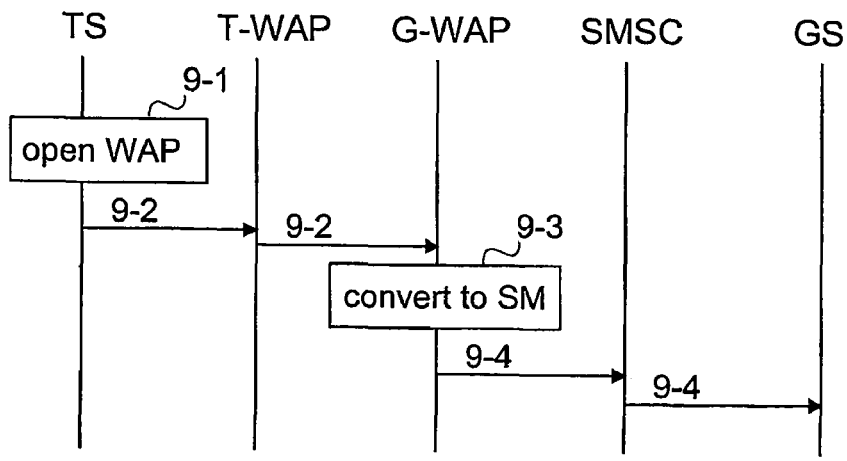
Figure 10:
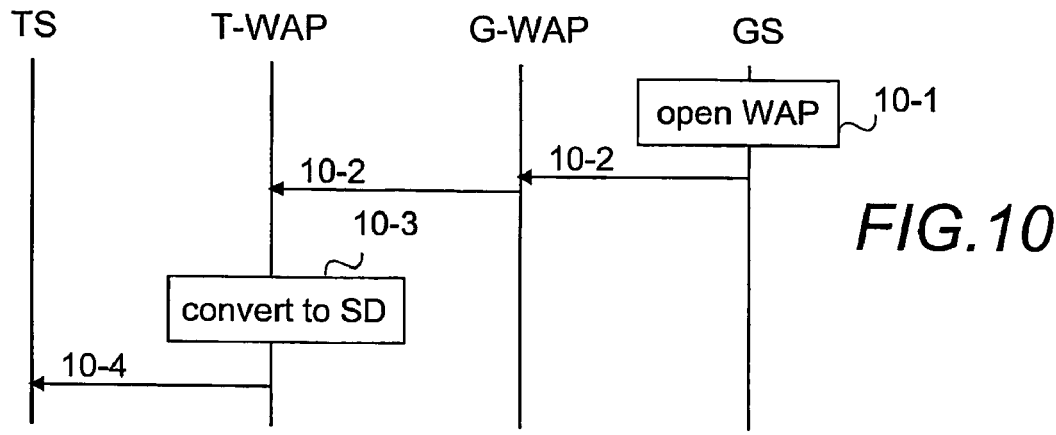

FIGS. 9 and 10 illustrate the signalling according to embodiment 4 of the present invention. Embodiment 4 employs the network architecture SA2 disclosed in FIG. 6. Furthermore, in embodiment 4 it is assumed that the sender's equipment has a WAP browser and a subscription allowing the use of different WAP services, or at least the text application in the corresponding WAP server. However, in the receiver's equipment no WAP browser is needed. The functionality of sending to an external system may be implemented directly in the sender's equipment or according to prior art WAP-service, as described above.

FIG. 9 depicts functionality according to embodiment 4 when the TS user wants to send a short message to a GS user. In point 9-1 a WAP browser is opened, and the WAP browser requests the content of the message, i.e. the text, and the GSM number of the GS, in a separate field. When the message is ready, the TS sends the message 9-2 to the TETRA WAP server having the text application T-WAP. Message 9-2 is preferably sent using the WAP IP. The TETRA WAP server forwards the message 9-2, i.e. the address and the content to the GSM WAP server having the text application G-WAP. When the text application G-WAP receives message 9-2, it separates the GSM-number of the receiver and the actual content from the message in point 9-3 and converts the message from the WAP message to a short message in point 9-3. After the conversion the message has the same structure as the short messages according to the GSM specifications. After the conversion the GSM WAP server sends the short message 9-4 via the short message service centre SMSC to the receiver's equipment GS according to prior art.

FIG. 10 depicts functionality according to embodiment 4 when the GS user wants to send a short message to a TS user. In point 10-1 a WAP browser is opened, and the WAP browser requests in a separate field the content of the message, i.e. the text, and the TETRA number of the TS. When the message is ready, the GS sends the message 10-2 to the GSM WAP server having the text application G-WAP. Message 10-2 is preferably sent using the WAP IP. The GSM WAP server forwards the message 10-2, i.e. the address and the content to the TETRA WAP server having the text application T-WAP. When the text application T-WAP in the TETRA WAP server receives message 10-2, it separates the content and the receiver's address from the message in point 10-3, converts them to be in SD form and sends the SD message 10-4 to the receiver's TS.

Figure 11:
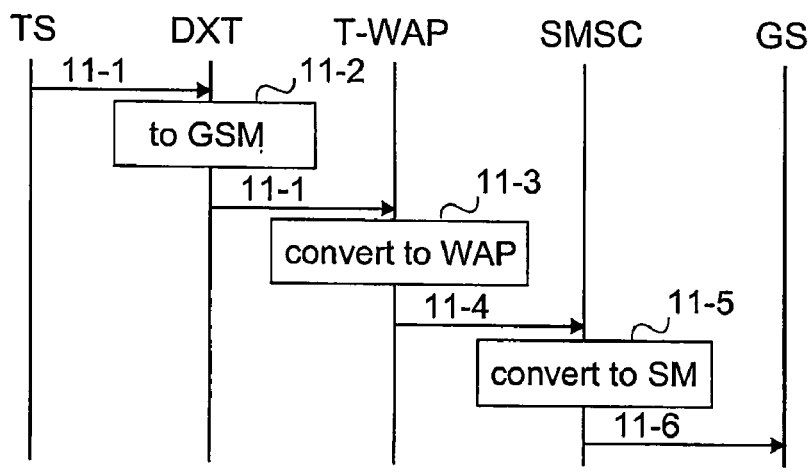
Figure 12:
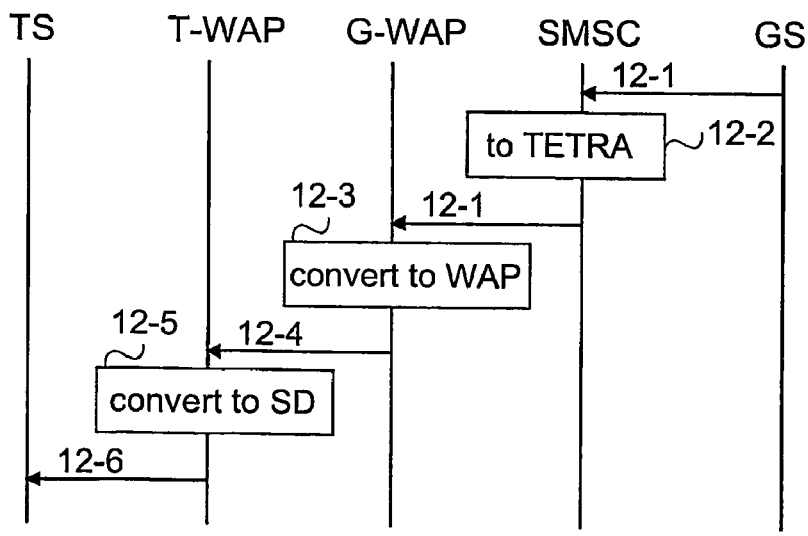

FIGS. 11 and 12 illustrate the signalling according to embodiment 5 of the present invention. Embodiment 5 employs the network architecture SA2 disclosed in FIG. 6. In embodiment 5 no WAP browser or WAP subscription is needed in the receiver's equipment and in the sender's equipment.

FIG. 11 depicts functionality according to embodiment 5 when the TS user wants to send a short data message, i.e. an SD, to a GS user. The TS user forms the SD and sends the SD in message 11-1 to the DXT, all this according to prior art. In embodiment 5, DXTs are configured to recognize SDs targeted to another system, such as the second system and route those SDs to the TETRA WAP server having the text application T-WAP. Therefore in point 11-2, the DXT recognizes on the basis of the receiver's number that the SD is targeted to the GSM system and forwards the message 11-2 to the TETRA WAP server having the text application T-WAP. When the text application receives message 11-2, it separates the GSM-number of the receiver and the actual content from the message in point 11-3 and converts the message from the short data message to a WAP message containing the GSM number and the content in point 11-3. Then the TETRA WAP server sends the WAP message 11-4 to the GSM WAP server having the text application G-WAP. When the text application G-WAP receives message 11-4, it separates the GSM-number of the receiver and the actual content from the message in point 11-5 and converts the message from the WAP message to a short message in point 11-5. After that the GSM WAP server sends the short message 11-6 via the short message service centre SMSC to the receiver's equipment GS according to prior art.

FIG. 12 depicts functionality according to embodiment 5 when the GS user wants to send a short message to a TETRA subscriber, i.e. to the TS. The GS user forms the short message and sends the short message 12-1 to the GS user's short message service centre SMSC, all this according to prior art. In embodiment 5, the SMSC is configured to recognize SMs targeted to another system, such as the first system, and route those SMs to the GSM WAP server having the text application G-WAP. Therefore, in point 12-2 the short message service centre recognises from the receiver's number that the short message is targeted to a TETRA subscriber and sends the short message 12-2 to the GSM WAP server having the text application. The GSM WAP server, and more specifically the text application, separates the content and the receiver's address from the short message in point 12-3 and converts the message from the short message to a WAP message containing the TETRA number and the content in point 12-3. Then the GSM WAP server sends the WAP message 12-4 to the TETRA WAP server having the text application T-WAP. When the text application T-WAP in the TETRA WAP server receives message 12-4, it separates the content and the receiver's address from the message in point 12-5, converts them to SD form and sends the SD message 12-6 to the receiver's TS.

Figure 13:
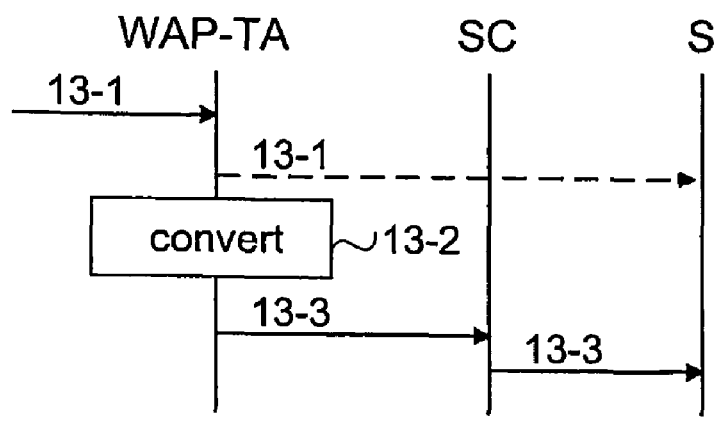
Figure 14:
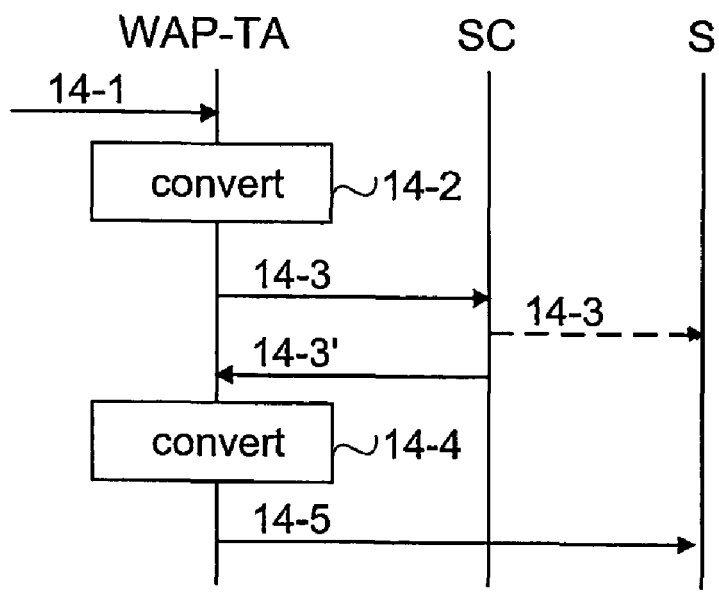

FIGS. 13 and 14 illustrate further embodiments of the invention. In FIGS. 13 and 14 the functionality of the text application serving the receiver is discussed. Since this functionality can be employed in the first system and in the second system, a sign WAP-TA is used for text application, a sign SC is used for messaging service centre functionality, and a sign S is used for the receiver's equipment. In FIGS. 13 and 14 the broken line illustrates unsuccessful message delivery.

In FIG. 13 the WAP-TA receives a message 13-1 targeted to the S. The message 13-1 is assumed to be in WAP message format. The WAP-TA tries to deliver the WAP-message 13-1 as described above, but the delivery does not succeed. Therefore, in point 13-2 the WAP-TA converts the message to a message having a structure used for messaging service messages in the receiver's system and delivers the converted message 13-3 via the SC to the receiver's S.

In FIG. 14 the WAP-TA receives a message 14-1 targeted to the S. The message 14-1 may have any structure the WAP-TA is configured to recognize. The WAP-TA converts in point 14-2 the message to be a message having a structure used for messaging service messages in the receiver's system and delivers the converted message 14-3 to the SC which tries to deliver the message 14-3 to the receiver's S but the delivery does not succeed. In this embodiment the SC is configured to send the message 14-3 back to the WAP-TA with an indication indicating that the delivery was unsuccessful. The message and the indication are sent in message 14-3'. Thus the SC does not store the message and try to deliver it later. The WAP-TA then converts the message to WAP message in point 14-4 and delivers the converted message 14-5 via the SC to the receiver's S.

The embodiments presented above or parts of them can be combined to produce preferred embodiments of the invention.

Although in the above WAP messages are transmitted so that the actual content of the message is first stored and the URL address of the content is sent to the receiver's equipment, it is obvious to one skilled in the art that it is also possible to first try to send the content to the receiver's equipment in a WAP message and if that does not succeed, to store the content and send the URL address of the content.

In the above embodiments the WAP is used. The advantage of this embodiment is that an already existing protocol is used and thus there is no need to standardise a new protocol. Furthermore, when the WAP is delivered using the IP, the load on the existing system can be minimised.

Even though in the above, the invention has been explained by means of text messages, such as short messages, it is, however, not limited solely to them, but it is obvious to a person skilled in the art how to apply the invention to other message services, such as multimedia messages.

Although the invention is described above using only two different message structures, the SD and the SM, it is obvious to one skilled in the art how to apply the invention to other message structures and to systems having more than two different structures.

The telecommunication system, network nodes and user equipment implementing the functionality of the present invention do not only comprise state-of-the-art means required for messaging services, but also means for converting and transmitting the messages in the manner described above. Present network nodes and user equipment comprise processors and memory, which can be utilized in the functions according to the invention. All modifications, arrangements and/or configurations required for implementing the invention can be performed as routines, which may be implemented as added or updated software routines, application circuits (ASIC) and/or programmable circuits, such as EPLD (Electrically Programmable Logic Device), FPGA (Field Programmable Gate Array).

It will be obvious to a person skilled in the art that, as the technology advances, the inventive concept can be implemented in various ways. The invention and its embodiments are not limited to the examples described above but may vary within the scope of the claims.

The invention claimed is:

1. A system, comprising:
a first system having a first structure for messaging service messages;
a second system having a second structure for the messages; and
a server via which a message is transmitted from the first system to the second system, wherein
the server is configured to utilize a bearer independent protocol in the transmission of the message from the first system to the second system,
said bearer independent protocol being above a bearer protocol in a protocol stack, the system comprises another server configured to utilize a bearer independent protocol to transmit the message, wherein one of the servers is a first server via which the message is transmitted from a sender in the first system to the second system and the other server is a second server via which the message is transmitted from the first system towards a receiver in the second system,
the first server is configured, in response to receiving the message having the first structure, to convert the message to have a structure according to the bearer independent protocol, and to send the converted message to the second server, and
the second server is configured, in response to receiving the message having a structure according to the bearer independent protocol, to convert the message to have the second structure before forwarding the message to the receiver.

2. A server comprising
at least one processor; and
at least one memory including computer program code;
the at least one memory and the computer program code configured to, with the at least one processor, cause the server to perform at least one of the following:
convert, in response to receiving a message having a first structure for messaging service messages from sender in a first system and targeted to a receiver in a second system having a second structure for the messages. the message to have a structure according to a bearer independent protocol, and to send the converted message to a second server; via which the message is transmitted from the first system towards the receiver in the second system; and
convert, in response to receiving a message having a structure according to the bearer independent protocol from the second server, the message originating from a sender in the second system and targeted to a receiver in the first system, the message to have the first structure before forwarding the message to the receiver; and forwarding the converted message to the receiver in the first system,
wherein said bearer independent protocol is above a bearer protocol in a protocol stack.

3. A method comprising:
receiving a message having a first structure for messaging service messages from sender in a first system and targeted to a receiver in a second system having a second structure for the messages;
converting the message having the first structure to have a structure according to a bearer independent protocol;
sending the converted message having the structure according to the bearer independent protocol to a second server; via which the message is transmitted from the first system towards the receiver in the second system;
receiving a message having a structure according to the bearer independent protocol from the second server, the message originating from a sender in the second system and targeted to a receiver in the first system;
converting the message having a structure according to the bearer independent protocol to have the first structure; and
forwarding the converted message having the first structure to the receiver in the first system,
wherein said bearer independent protocol is above a bearer protocol in a protocol stack.

* * * * *